United States Patent [19]
Chang et al.

[11] Patent Number: 5,958,016
[45] Date of Patent: Sep. 28, 1999

[54] INTERNET-WEB LINK FOR ACCESS TO INTELLIGENT NETWORK SERVICE CONTROL

[75] Inventors: Te-An Chang, Laytonsville; Joseph R. Rostock, Davidsonville, both of Md.

[73] Assignee: Bell Atlantic Network Services, Inc., Arlington, Va.

[21] Appl. No.: 08/904,117

[22] Filed: Jul. 13, 1997

[51] Int. Cl.⁶ .................................................. H04M 1/24
[52] U.S. Cl. ..................... 709/229; 709/202; 709/203; 709/219; 709/224; 709/225
[58] Field of Search .................... 395/200.59, 200.55, 395/200.54, 200.49, 200.33, 200.32; 709/229, 225, 224, 219, 203, 202

[56] References Cited

U.S. PATENT DOCUMENTS

| | | |
|---|---|---|
| 4,768,150 | 8/1988 | Chang et al. . |
| 4,855,905 | 8/1989 | Estrada et al. . |
| 5,241,588 | 8/1993 | Babson, III et al. ................... 379/201 |
| 5,247,571 | 9/1993 | Kay et al. . |
| 5,287,103 | 2/1994 | Kasprzyk et al. . |
| 5,309,437 | 5/1994 | Perlman et al. . |
| 5,327,486 | 7/1994 | Wolff et al. . |
| 5,377,186 | 12/1994 | Wegner et al. . |
| 5,392,357 | 2/1995 | Bulfer et al. . |
| 5,406,557 | 4/1995 | Baudoin . |
| 5,423,003 | 6/1995 | Berteau . |
| 5,436,957 | 7/1995 | McConnell . |
| 5,469,500 | 11/1995 | Satter et al. . |
| 5,471,459 | 11/1995 | Gut . |
| 5,495,521 | 2/1996 | Rangachar . |
| 5,499,290 | 3/1996 | Koster . |
| 5,517,562 | 5/1996 | McConnell . |
| 5,519,772 | 5/1996 | Akman et al. . |
| 5,526,413 | 6/1996 | Cheston, III et al. . |
| 5,526,489 | 6/1996 | Nilakantan et al. . |
| 5,539,886 | 7/1996 | Aldred et al. . |
| 5,566,235 | 10/1996 | Hetz . |
| 5,572,581 | 11/1996 | Sattar et al. . |
| 5,572,583 | 11/1996 | Wheeler, Jr. et al. . |
| 5,586,177 | 12/1996 | Farris et al. . |
| 5,623,601 | 4/1997 | Vu ...................................... 395/187.01 |
| 5,721,908 | 2/1998 | Lagarde et al. ......................... 395/610 |
| 5,802,146 | 9/1998 | Dulman ...................................... 379/34 |
| 5,826,029 | 10/1998 | Gore et al. .......................... 395/200.57 |

*Primary Examiner*—Zarni Maung
*Assistant Examiner*—Saleh Najjar
*Attorney, Agent, or Firm*—McDermott, Will & Emery

[57] ABSTRACT

A web page type interface is provided, which enables subscriber access to control and reporting functionalities of a communication network, such as the advanced intelligent telephone network, via a public packet data network, typically the network now commonly known as the Internet. The web page based Internet access opens the personal control of services provided by the communication network to any subscriber who also uses the Internet, for example using the subscriber's existing PC and browser software or their Web-TV terminal. A secure access platform provides the interface and communicates via a private data network with various systems used to manage the communication network. The secure access platform includes a firewall coupled between the public data network and the private data network. The firewall implements the web page interface and validates certain users of the public data network as subscribers to services of the communication network. The secure access platform also includes a web services management system, which communicates with the firewall and with the communication network management systems via the private data network. The platform enables persons surfing the web to control their services and receive various reports relating to status and/or usage of their network services.

27 Claims, 5 Drawing Sheets

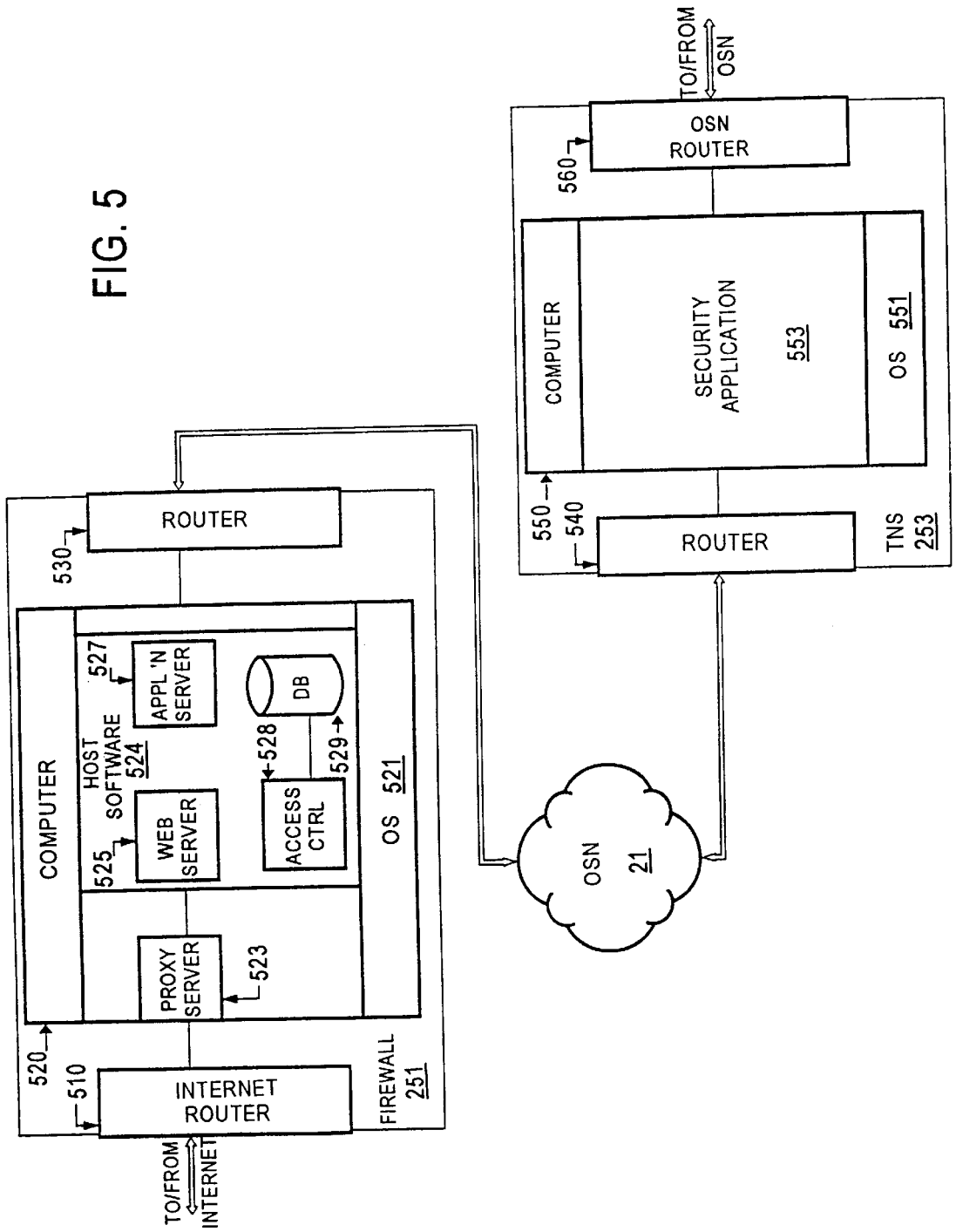

INTERNET-WEB LINK FOR ACCESS TO INTELLIGENT NETWORK SERVICE CONTROL

TECHNICAL FIELD

The present invention relates to a system and methodology for providing telephone service customers with a standardized interface for access to service control and management elements of a communication network, such as the telephone network, via a public packet switched data network, such as the Internet.

Acronyms

The written description uses a large number of acronyms to refer to various services, messages and system components. Although generally known, use of several of these acronyms is not strictly standardized in the art. For purposes of this discussion, acronyms therefore will be defined as follows:

Advanced Intelligent Network (AIN)
Automatic Message Accounting (AMA)
Autonomous System (AS)
Call Processing Record (CPR)
Central Office (CO)
Common Channel Interoffice Signaling (CCIS)
Competing Local Exchange Carrier (CLEC)
Customer Premises Equipment (CPE)
Data Distributor (DD)
Data Reporting System (DRS)
File Transfer Protocol (FTP)
Generic Data Interface (GDI)
HyperText Mark-Up Language (HTML)
HyperText Transfer Language Protocol (HTTP)
Integrated Service Control Point (ISCP)
Integrated Services Digital Network (ISDN)
Intelligent Peripheral (IP)
IntereXchange Carrier (IXC)
Internet Service Provider (ISP)
ISDN Users Part (ISDN-UP)
Local Area Network (LAN)
Local Exchange Carrier (LEC)
Memory Administration Recent Change System (MARCH)
Multipurpose Internet Mail Extension (MIME)
Multi-Services Application Platform (MSAP)
Office Equipment (OE) number
Operations Systems Network (OSN)
Personal Computer (PC)
Personal Identification Number (PIN)
Plain Old Telephone Service (POTS)
Point In Call (PIC)
Primary Rate Interface (PRI)
Public Switched Telephone Network (PSTN)
Regional Bell Operating Companies (RBOCs)
Revenue Accounting Office (RAO)
Service Control Point (SCP)
Service Creation Environment (SCE)
Service Management System (SMS)
Service Order Administration and Control System (SOACS)
Service Switching Point (SSP)
Signaling Point (SP)
Signaling System 7 (SS7)
Signaling Transfer Point (STP)
Simplified Message Desk Interface (SMDI)
Station Message Detail Recording (SMDR)
Transaction Capabilities Application Part (TCAP)
Transmission Control Protocol/Internet Protocol (TCP/IP)
TRunk (TR)
Trusted Network System (TNS)
Universal Resource Locator (URL)
Web Service Management System (WSMS)

BACKGROUND

For some years, the telephone industry has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers". An office which detects a trigger suspends processing of a call, compiles a call data message and forwards that message via a common channel interoffice signaling (CCIS) link to a database system, such as an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. For an ordinary telephone service call, there would be no event to trigger AIN processing; and the local and toll office switches function normally and process such a call without referring to the central database for instructions. An AIN type network for providing an Area Wide Centrex service, for example, was disclosed and described in detail in commonly assigned U.S. Pat. No. 5,247,571 to Kay et al.

In an AIN network developed by the Regional Bell Operating Companies (RBOCs) and Bell Communications Research (Bellcore), a terminal and software system referred to as 'SPACE' functions as the service creation environment and/or service provisioning system for the AIN control functions in the central database system. For example, as disclosed in U.S. Pat. No. 5,241,588 Babson, III et al., customized call processing information records are created and/or modified in a graphical environment, by creating or modifying a customer's service graph-on the display terminal. Data corresponding to the service graph is then stored in a service control point (SCP) database. Other terminal and software systems could be used to create and provision the AIN services. For AIN services today, however, telephone company personnel utilize the SPACE system to create templates for the service logic for new services. When customers subscribe to the services, the templates are filled in with the subscribers' data to create individual call processing records (CPRs). The CPRs are stored in the database in the SCP or in an ISCP, for controlling actual call processing.

Many of the enhanced communication services offered by the AIN permit a subscriber to input control information, to manage services as desired. For example, in a simple forwarding or redirection service, the subscriber might change the 'forward to' number from time to time to route calls to different destinations. As another example, a subscriber might want to block calls unless they are to or from numbers on a list, and the subscriber would want to change the list of numbers from time to time. Some subscribers need to change certain information quite frequently, even for relatively simple AIN services. It is too cumbersome to require the subscriber to call the local telephone company's business office and request each and every one of the routine changes.

At present, automated subscriber interactions to modify the subscribers' AIN services rely mainly on a voice response type interaction. The subscriber calls a special number, hears recorded announcements or synthesized voice prompts and inputs a PIN number and service related information. Typically, the subscriber inputs the various information by keying buttons on a Touch Tone telephone, but use of speech recognition technology has been proposed to enable a subscriber to vocally input the information.

Consider for example, commonly assigned U.S. Pat. No. 5,572,583 to David F. Wheeler, Jr. and Robert D. Farris. This Patent discloses an intelligent peripheral (IP) for providing enhanced call processing functions, such as announcement and digit collection, voice recognition, facsimile mail and voice mail, in an AIN type telephone network. The IP connects through telephone line groups to one or more Service Switching Point (SSP) offices of the telephone network. The IP also communicates with an ISCP via a signaling network separate from the voice circuits and from the CCIS network that interconnects the ISCP to the SSP offices. One major use for the disclosed IP relates to provisioning and/or modifying services. The IP provides prompts and receives dual-tone-multi-frequency tone signals or speech inputs from subscribers.

Typically, a telephone company technician initially sets up a subscriber's service using the Service Creation Environment or SCE in the ISCP. As part of this procedure, the technician establishes one or more data tables for the subscriber in the service control point (SCP) database 43. Subsequently, the subscriber controls the service by inputting data to populate the subscriber's data table(s) through an interaction with the IP. The newly input control data is transferred from the IP to the ISCP for storage and for subsequent control of the subscriber's communication services. The IP also may provide a data interface for PC based access, Such interactive voice response processing provides only limited input capabilities and is subject to input errors, because the subscriber accidently hits the wrong button or incorrectly pronounces a spoken input. Many of the AIN services require subscriber inputs, for example combinations of blocked numbers, time of day and day of the week, that are too complex for the average subscriber to input using the interactive voice response procedures.

Several other patents have suggested data terminal or PC access, through a local area network or direct dial-up links to a host computer in the telephone network.

For example, commonly assigned U.S. Pat. No. 5,436,957 to Von K. McConnell relates to an AIN-based technique enabling a commercial telephone subscriber to selectively activate service through a group of lines assigned to the subscriber. To facilitate input of the data for controlling the selective service activation, McConnell suggested use of PC type data terminals. One PC connects to the service management system (SMS) in the ISCP via a dedicated data communication line. Another PC communicates with the SMS via a dial-up modem session through the telephone network. Either PC may store information relating to the subscriber's products and services and preset tables or forms for entry of the necessary data to control that subscriber's restricted access communication services.

With the McConnell system, when the subscriber wants to activate communication services in relation to one or a series of products or services (e.g., a delayed or canceled airline flight), the representative accesses the necessary data relating to products or services and completes the data tables to activate the communication services, for example identifying the particular line(s) for which service will be active and the on and off times. When the representative has entered and confirmed the data for activating the service, the PC downloads that data to the SMS within the ISCP. The SMS updates the appropriate records in the ISCP, after which the ISCP activates services from the subscriber lines in accord with the most recently entered data.

Commonly assigned U.S. Pat. No. 5,526,413 issued Jun. 11, 1996 to Frank C. Cheston, III, James E. Curry and Robert D. Farris suggests extending AIN into customer premises equipment (CPE). The CPE system includes a signaling transfer point (STP) coupled to the CCIS system of the public telephone network as well as an ISCP database. The ISCP on the customer premises may be implemented in software in a personal computer. Although not disclosed in detail in the issued Cheston, III, et al. Patent, a related application (Ser. No. 08/508,428) adds the teaching of customer programming of the network ISCP from the CPE equipment. In accord with this aspect of the Cheston et al. invention, a PC or other computer on the customer premises will run telephone service programming software. The signaling communication link to the CCIS network of the exchange carriers permits the subscriber using the on-premises PC and software to load AIN service information into the relevant CPE devices as well as into the ISCPs and switches of the local exchange carrier network and the interexchange carrier (IXC) network.

Although the PC or terminal based solutions offer some enhanced subscriber access to control AIN services, the solutions proposed to date have inherent limitations. Any of these prior art implementations using a PC or terminal to access the network require specialized terminals and/or software and provide only limited access. Also, in most cases, the local operating company must maintain the local area network or a bank of modems to provide the PC access service.

A need therefore still exists for a technique which will enable any subscriber to personally access and control their AIN services from a general purpose computer without specially developed hardware or software interfaces.

DISCLOSURE OF THE INVENTION

The present invention addresses the above-stated needs by providing a web page type interface, for accessing control of intelligent network type telephone services, via a public packet data network, such as the network now commonly known as the Internet. Typically, a person's PC or other terminal runs common software, such as a 'browser' to obtain various web pages of information from the network. While viewing web pages using the browser, the invention enables persons surfing the web to access the telephone network, to control their telephone services and receive various reports relating to their telephone services. The inventive web access also provide an architecture, which maintains the necessary security of the telephone network and associated network management systems.

Thus, one aspect of the invention relates to a communication network. The overall network includes a traffic network for providing selective communications to subscriber stations and an operations network. One example of such a communication network is a public switched telephone network. At least one network management system is coupled to the operations network, for managing selective communication services provided through nodes of the traffic network. The overall communication network also includes a secure access platform coupled to the operations network and for coupling to a public data network.

The secure access platform validates predetermined users of the public data network as subscribers to services of the communication network. The platform implements a standard graphical user interface of the public data network, preferably an Internet type web page interface, enabling communications with terminals on the public data network. The platform also communicates with the management system. The platform enables validated subscribers to review service data from the network management system and to input control data to the network management system. In response to the control data, the network management system modifies operations of the traffic network as selected by the validated subscribers.

Examples of network management systems include provisioning systems and usage and/or billing data processing systems. The provisioning systems establish or modify data files or records, in various elements of the traffic network, that control subscribers' services. The data processing systems receive operational data from the elements of the traffic network and process that data, for example to generate subscriber usage reports or bills.

The control data input by the subscribers may control services facilitated through high level network control points. In an intelligent network implementation of a telephone network, for example, the control data is used to establish or modify call processing records stored in a service control point. The control data also may be used to modify individual subscriber profiles in central office switching systems of the telephone network.

The service related data presented to the users through the graphical user interface may relate to existing services provided by the communication network, e.g. stored in a provisioning system. For example, this data may relate to current status of intelligent network services to which each customer subscribes. The service related data also may relate to usage of the communication network services and/or to the account or billing for services used, as supplied from a data processing system.

Another aspect of the invention relates to a specific implementation of the secure access platform. The platform includes a firewall and a service management system. The firewall is coupled to the public data network. The firewall comprises a proxy server, an application server and an access control. The application server provides the standard graphical user interface through the proxy server for users accessing the firewall via the public data network. The access control authenticates users of the packet data network as valid subscribers of communication network services. The service management system communicates with the application server and the network management system. The service management system receives subscriber inputs via the application server and processes at least some of the subscriber inputs to provide data to the network management system. The service management system also sends at least some information, relating to services provided to subscribers by the communication network, from the network management system through the application server and the public data network to subscribers.

The preferred embodiment also includes a further security system logically operating between the firewall and the service management system. All messages going to and from the firewall via the operation network, including communications between the firewall and the service management system, pass through this network security system. The network security system passes message to and from the firewall only if the messages are valid in accord with certain security restrictions.

As noted, in the preferred embodiment, the traffic network is an intelligent telephone network. The nodes of the traffic network, for example, include various central office switching systems of the telephone network. The central offices are interconnected by trunks for carrying interoffice traffic and by a signaling network, which carries call set-up related messages and other signaling communications. The intelligent implementation of the telephone network also includes a service control point. The service control point stores data for controlling certain call processing operations of the central office switching systems.

The operations network provides communications between one or more provisioning systems and the elements of the telephone network, such as the central office switching systems and/or the service control point. The operations network also carries communications between the telephone network elements and one or more data processing systems, which generate usage reports and bills.

Through the web page access provided by the platform, telephone subscribers can review the status of their services and modify or upgrade their telephone services, including switch-based services and intelligent network services controlled through the data stored in the service control point. Subscribers also may review reports of usage of their services or review account or billing statements.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

FIG. 5 is a detailed block diagram of the firewall and the trusted network system used in the system of FIG. 2.

BEST MODE FOR CARRYING OUT THE INVENTION

Recently, considerable public attention has focused on the packet data network known as the Internet and the range of information and multimedia services available via the 'World Wide Web' portion of that network. Typically, a person's PC runs common software referred to as a 'browser' to obtain various web pages of information from the network. Several vendors also now offer a 'Web-TV' terminal device for coupling to a television set, to provide web browsing and other Internet services using a remote control and a television screen. While viewing pages using either type of terminal, the user can enter requests by clicking on text or icons or can send typed inputs to a server. The invention enables persons surfing the web using such common technology to access a communication network, preferably the AIN telephone network, to control their services and receive various reports relating to their services.

The inventive Internet access opens the personal control of AIN telephone services to any subscriber who also uses the Internet, using the subscriber's existing PC and software or their Web-TV terminal. However, Internet access raises serious security concerns. The inventive web access therefore entails an access architecture, which provides the web page type user interface via the Internet and maintains the necessary security of the telephone network and associated network management systems. The inventive access system also offers efficient service management, both for provisioning functions and for usage monitoring functions.

Figure 1:
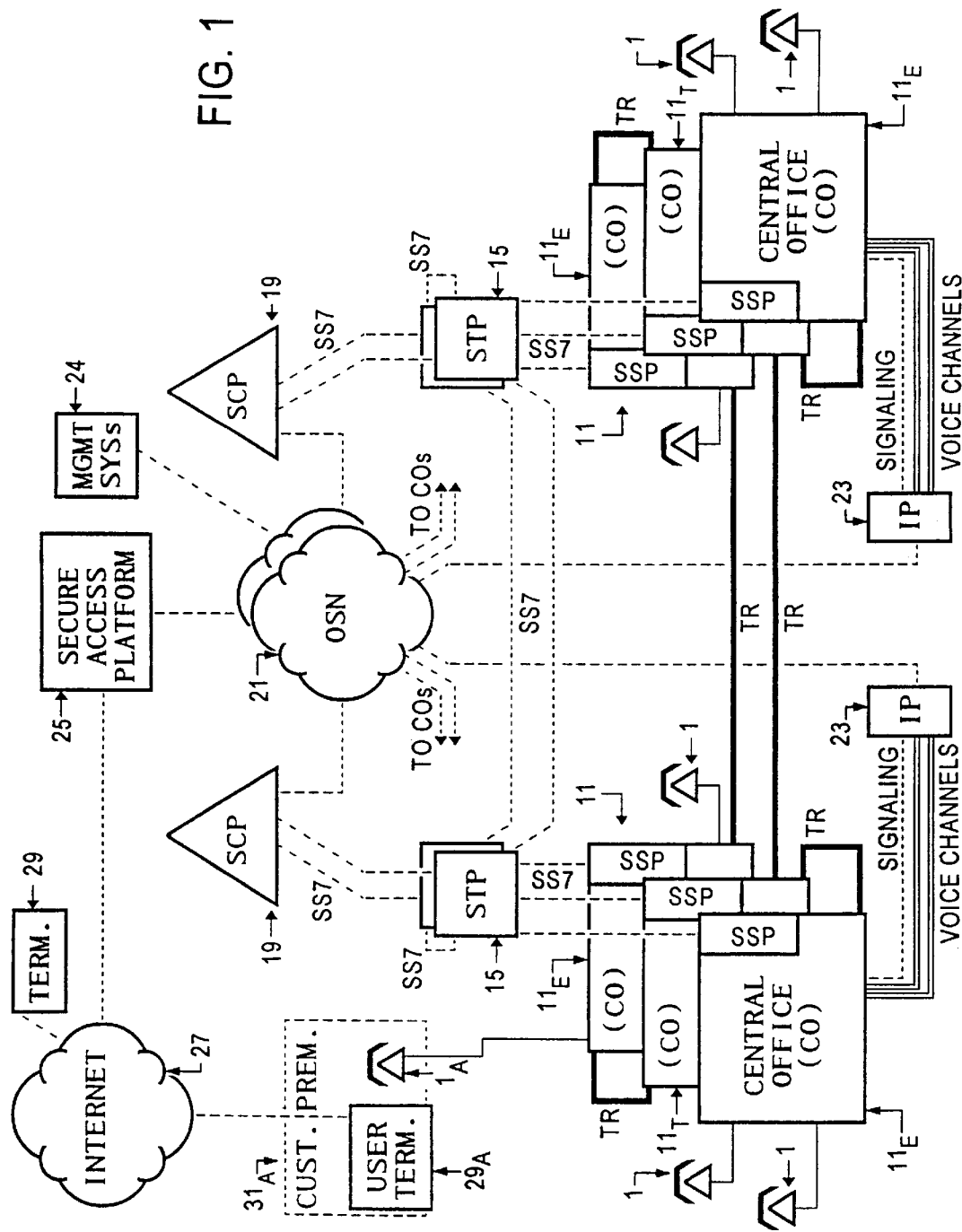
FIG. 1 is a high level functional block diagram of an intelligent telephone network, systems for managing services provided by that telephone network and a system for providing secure Internet type access to subscribers to allow them to manage their telephone services via the Internet, in accord with the invention.

FIG. 1 provides a high level illustration of an intelligent telephone network, its control and management systems as well as the customer access thereto provided by the invention. To understand the invention, it may be helpful first to review the structure and operation of the telephone network.

The overall communication network illustrated in FIG. 1 includes a telephone type traffic network as well as a private operations data network and management systems coupled thereto to provision and report on operations of the telephone network. The communication network connects to a public packet switched data network, such as the Internet, and through that network to a variety of users terminal devices. A secure access platform interfaces the public packet switched data network to the private data network associated with the telephone system. The access through the secure platform allows users to operate their terminals to access the telephone network management systems via the Internet.

In the example depicted in FIG. 1, the telephone network is an advanced intelligent network or 'AIN'. As shown, the telephone network includes a switched traffic network and a common channel signaling network carrying the control signaling messages for the switched telephone traffic network. The telephone or traffic network, operated by one carrier or a combination of local carriers and interexchange carriers, includes a number of nodes, typically end office and tandem office type central office (CO) switching systems 11 interconnected by trunk circuits TR.

FIG. 1 shows a number of subscriber stations, depicted as telephones 1, connected to a series of central office switches 11. In the preferred implementation, the connections to the central office switches 11 utilize telephone lines (e.g. POTS or ISDN), and the switches are telephone type switches for providing landline communication. However, it should be recognized that other communication links and other types of switches could be used. For example, some or all of the connections between the stations 1 and the central offices may include digital or analog radio inks, and the central offices may include mobile telephone switching offices. Trunk circuits TR carry communication traffic between the central office switches 11.

Each end office type central office switch $11_E$ provides switched telephone connections to and from local communication lines or other subscriber links coupled to end users stations or telephone sets 1. The typical telephone network also includes one or more tandem switching offices such as offices $11_T$, providing trunk connections between end offices and/or between other tandem offices. Other trunks TR might directly connect end offices $11_E$. Some offices may serve as both end offices and tandem offices for providing different call connections. As such, the traffic network consists of local communication links and a series of switching office type nodes interconnected by voice grade trunks TR.

Although shown as telephones in FIG. 1, the terminal devices or stations 1 can comprise any communication device compatible with the local communication link. Where the link is a standard voice grade telephone line, for example, the terminals could include facsimile devices, modems etc. As discussed more later, many subscribers will have terminals with access to a public packet switched data network, such as the Internet, and many of those terminals will utilize modem connections through the lines and switches 11 of the telephone traffic network to access the public data network.

The lines and trunks through the central offices 11 carry the communication traffic of the telephone network, including voice traffic and some Internet access traffic. The preferred telephone network, however, also includes a common channel interoffice signaling (CCIS) network carrying a variety of signaling messages, principally relating to control of processing of various calls through the traffic portion of the network. The CCIS network includes packet data links (shown as dotted lines) connected to appropriately equipped central office switching systems such as offices 11 and a plurality of packet switches, termed Signaling Transfer Points (STPs) 15. To provide redundancy and thus a high degree of reliability, the STPs 15 typically are implemented as mated pairs of STPs. The STPs of each pair are interconnected with each other and with other pairs of STPs on the CCIS network. The CCIS network of the telephone system operates in accord with an accepted signaling protocol standard, preferably Signaling System 7 (SS7).

In the preferred embodiment shown in FIG. 1, each central office 11 has at least minimal SS7 signaling capability, which is conventionally referred to as a signaling point (SP) in reference to the SS7 network. As such, the offices can exchange messages relating to call set-up and tear-down, typically in ISDN users part format (ISDN-UP) of the SS7 protocol.

At least some, and preferably all, of the central office switches 11 are programmed to recognize identified events or points in call (PICs) as advanced intelligent network (AIN) type service triggers. In response to a PIC or trigger, a central office 11 initiates a query through the CCIS signaling network to a control node, such as one of the Service Control Points (SCPs) 19, or to a database system. An SCP 19 provides instructions relating to AIN type services in response to such queries. The signaling message communications between the central office switching systems utilize messages conforming to the Transaction Capabilities Application Part (TCAP) of the SS7 protocol. Those central office switching systems having full AIN trigger and TCAP query and response processing capabilities, for communication with the SCP, are referred to as Service Switching Points (SSPs).

A typical telephone network serving a large number of customers over a wide geographic area utilizes a number of SCPs 19, two of which appear in FIG. 1. Each SCP 19 connects through SS7 links to one pair of the STPs 15. For most AIN services, a central office 11 obtains the requisite call control information from one SCP 19 serving the area in which the switch resides. However, some services do require signaling communication to more than one of the SCPs 19 to complete processing of a given call, and a variety of techniques for mediating these communications to local and remote SCPs are known.

The central office switches 11 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

The above described data signaling network between the SSP type central offices 11 and an SCP 19 is preferred, but other signaling networks could be used. For example, instead of the packet switched type links through one or more STP's, a number of central office switches 11, one of the SCPs 19 as well as other signaling nodes in a region could be linked for data communication by a token ring network. Also, the SSP capability may not always be available at the local office level, and several other implementations might be used to provide the requisite SSP capability. For example, none of the end office switches $11_E$ may have SSP functionality. Instead, each end office would connect through a trunk to a tandem office $11_T$ which has the SSP capability. The SSP tandem $11_T$ then communicates with the SCP via an SS7 type CCIS link, as in the implementation described above. The SSP capable tandem switches are digital switches, such as the 5ESS switch from AT&T; and the non-SSP type end offices might be 1A analog type switches.

The preferred telephone network also includes one or more intelligent peripherals (IPs) 23 to provide enhanced announcement and digit collection capabilities and preferably speech recognition. The IP 23 is essentially similar to that disclosed in commonly assigned U.S. Pat. No. 5,572,583 to Wheeler, Jr. et al. entitled "Advanced Intelligent Network with Intelligent Peripherals Interfaced to the Integrated Services Control Point," and the disclosure of the network and operation of the IP from that Patent is incorporated herein in its entirety by reference.

Each IP 23 may connect to one or more of the central offices 11. The connections transport both communication traffic and signaling. The connection between a central office 11 and the IP 23 may use a combination of a T1 and a Simplified Message Desk Interface (SMDI) link, but preferably this connection utilizes a primary rate interface (PRI) type ISDN link. Each such connection between a CO 11 and an IP 23 provides digital transport for a number of two-way voice grade type telephone communications and a channel transporting signaling data messages in both directions between the switch 11 and the IP 23.

There are certain circumstances in which the SCP 19 communicates with the IP 23. These communications could utilize an 1129 protocol and go through an SSP type central office 11 and the SS7 network. However, in the preferred embodiment of FIG. 1, the IP 23 and the SCP 19 communicate with each other via a separate second signaling network, for example via the network referred to as the Operations Systems Network (OSN) 21 in the drawing. These communications through network 21 between the IP and the SCP may utilize an 1129+ protocol or a generic data interface (GDI) protocol as discussed in the above incorporated Patent to Wheeler, Jr. et al.

On a normal call, an end office type switch $11_E$ will detect an off-hook condition on the line and provide dial tone. The switch identifies the line by its Office Equipment (OE) number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called party's station or line. The switch terminating a call to a destination will also utilize profile information relating to the destination, for example to forward the call if appropriate, to apply distinctive ringing, etc.

AIN call processing involves a query and response procedure between an SSP capable switching office 11 and a database system, such as an SCP 19. The SSP capable switching offices initiate such processing upon detection of triggering events. At some point during processing of a telephone call, a central office switching system 11 will recognize an event in call processing as a 'Point in Call' (PIC) which triggers a query, for example to the SCP 19. Ultimately, the SCP 19 will return an instruction to the switching system 11 to continue call processing. This type of AIN call processing can utilize a variety of different types of triggers to cause the SSPs 11 to initiate the query and response signaling procedures with the SCP 19.

In operation, any given subscriber's telephone services therefore may be controlled by data residing in one or more of the central office switching systems 11, in one or more of the SCPs 19 or in one or more of the IPs 23. In a network such as shown in FIG. 1, routing typically is based on dialed digit information, profile information regarding the link or station used by the calling party and profile information regarding a line or station in some way associated with the dialed digits. The respective end office switches $11_E$ store the profiles associated with the stations or lines served out of those offices. In the intelligent network implementation, each SCP 19 maintains a Multi-Services Application Platform (MSAP) database, which contains call processing records (CPRs) for processing of calls to and from various subscribers to AIN type services. For some services requiring processing by an IP 23, the IP also may store subscriber specific control information, for use in providing the subscriber with the desired service.

The telephone network operating company or carrier(s) utilize various network management systems 24. The 'management' of services includes control functions as well as monitoring and usage accounting functions. The management systems 24 include provisioning systems to establish, update and maintain the profiles and other control data in the central offices 11, the SCPs 19 and the IPs 23. The management systems 24 also include usage data processing systems for accumulating usage statistics and for processing usage data to create billing records.

As discussed more later, call processing records (CPRs) in the Multi-Services Application Platform (MSAP) database within each ISCP are created and management by a terminal system referred to as a service creation environment (SCE) and a service management system (SMS). Profile data may be loaded into memory in the switches by an automated system, such as Memory Administration Recent Change System or 'MARCH'. MARCH qualifies the data, and if the data meets the relevant qualification criteria, MARCH transmits the data to the appropriate central office switch 11 for entry into memory. The management systems 24 may also include a variety of data accumulation systems, such as a data distributor coupled to an SCP and a computer system serving in a revenue accounting office, for preparing usage statistics and/or calculating bills.

The present invention provides telephone service customers an easy, effective mechanism to interact with the various telephone network management systems 24, and thereby manage all of the control information that effects their telephone services and to obtain usage and billing related information regarding their telephone services.

The telephone company may operate one two or more data networks, having varying levels of security, for internal private data communications networks as management or operations networks. FIG. 1 shows two such networks, whereas the other drawings show a single operations network. The various management systems connect to one or more of the internal data networks. For purposes of discussion herein, the internal data network(s) are collectively referred to as the Operations Systems Network or 'OSN' network 21. The connection of the management systems 24 to the OSN 21 enables communication between the management systems and between those systems and the various elements of the telephone network. In accord with the invention, the OSN also connects to a secure access platform 25.

The secure access platform interfaces to a public packet switched data network, such as the Internet 27. To the network 27, the platform 25 appears as a Web server, and as discussed more below, the platform receives HTTP requests and provides HTML web pages in response.

Various terminals 29 connect to the public data network 27 for a wide range of data communications. The terminals may be stand-alone devices, such as personal computers (PCs) or Web-TV type devices, or the terminals 29 may be terminals associated with host computer systems (not shown), such a X-terminals.

In accord with the invention, the platform 25 enables anyone using a terminal 29 coupled to the network 27 to at least obtain information from the operator(s) of the telephone network. For users of the public data network who have subscribed to service control via the network 27 and the platform 25, the platform validates their identities. Such valid subscribers to telephone network services can then use their terminals 29 and access through the platform 25, to review and in at least some cases modify their own service related data in the network management systems 24. The network management systems 24 update the control data in the appropriate elements of the telephone network to effectuate changes selected by the subscribers.

The terminal 29 may be anywhere that is convenient for the subscriber and which provides access to the public packet switched data network, i.e. to the Internet 27. For example, a subscriber who has a terminal 29 with Internet access at the office may access management data relating to her business telephone services or management data relating to the her home telephone service. A user with a laptop having a modem, can access the Internet and thus perform his telephone service management while traveling, from any point where he can connect to a telephone line and call in to his Internet Service Provider (ISP).

Also, many residential customers have a user terminal in the home. For example, the drawing shows a customer premises $31_A$ having a telephone $1_A$ connected to an end office $11_E$ as well as a user terminal $29_A$ coupled to the Internet 27. In this example, the subscriber may use the terminal to surf the world wide web for entertainment, research, home shopping and other purposes. In accord with the invention, the user also can surf to the platform 25, obtain reports as to her existing telephone services and usage associated with the line to telephone station $1_A$, and if desired modify or obtain new telephone services for that station.

The use of Internet terminals, HTML communications and web page type displays to customers provides a standard, graphical user interface. The customer typically will have the terminal with the necessary software, for other Internet usage, and there is no need for specialized terminals or software.

Figure 2:
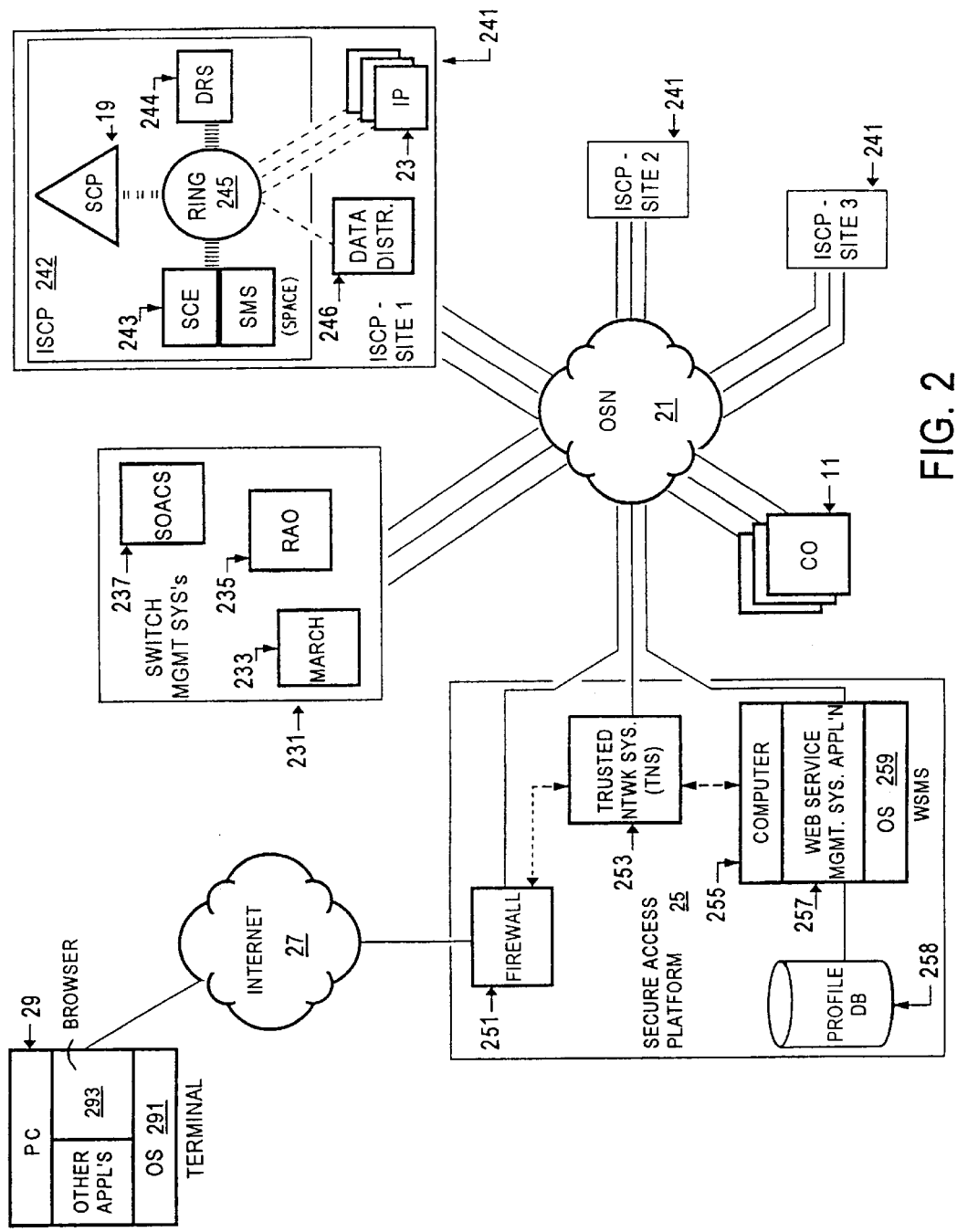
FIG. 2 is a somewhat more detailed block diagram useful in understanding the secure customer access, in accord with the invention.
Figure 3:
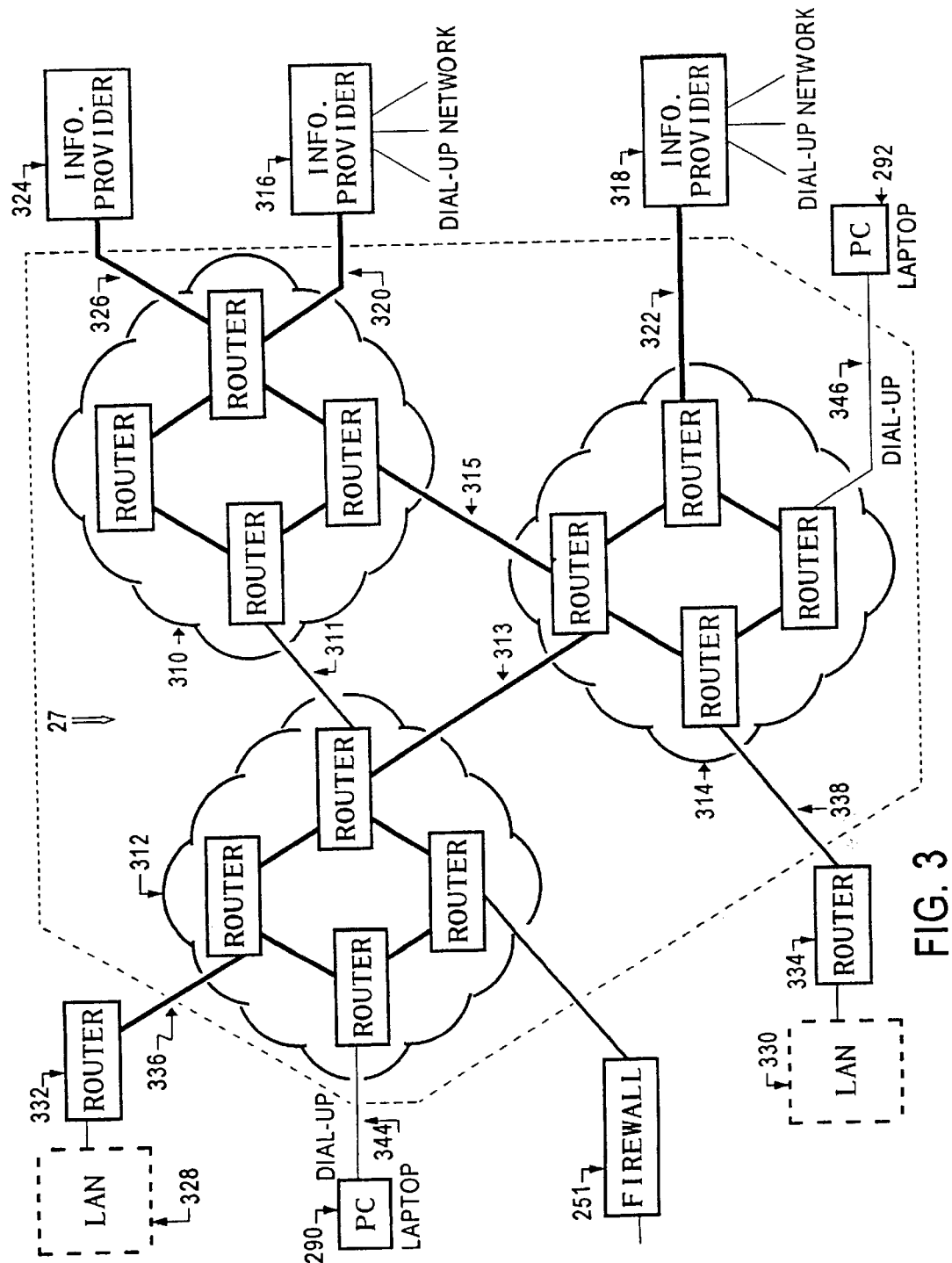
FIG. 3 is a block diagram of the public packet switched data network now commonly referred to as the Internet.
Figure 4:
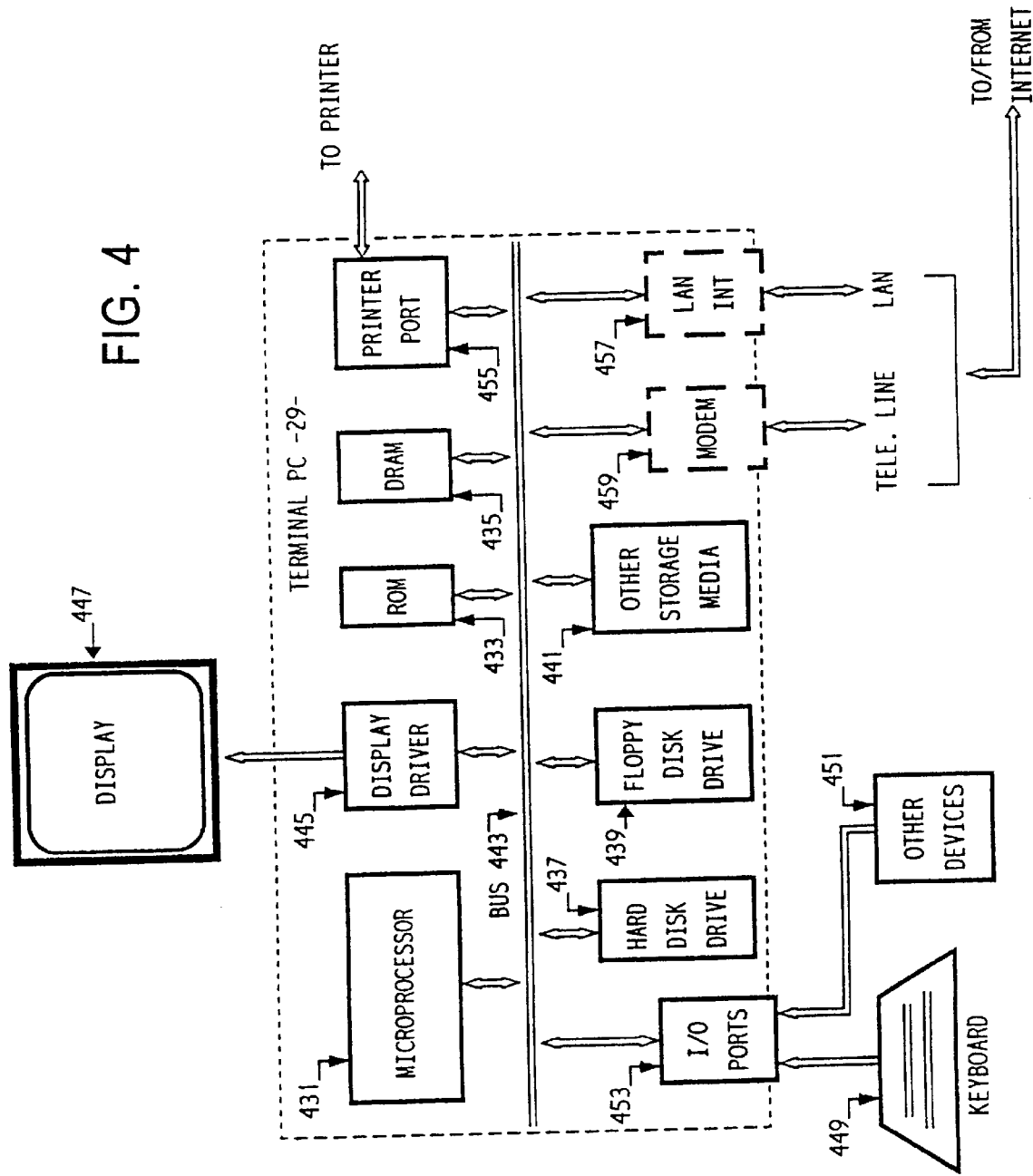
FIG. 4 is a block diagram of one embodiment of a terminal, in the example a personal computer, for accessing the management systems of the intelligent telephone network in accord with the invention.

FIG. 2 provides somewhat more detail of several portions of the inventive system, and FIGS. 3, 4 and 5 provide still more detail regarding several elements of the system shown in FIG. 2. As shown in these drawings, the public packet switched data network (Internet) 27 provides communications between a variety of users terminals 29 and the secure access platform 25.

FIG. 3 shows a simplified diagram of the Internet and various types of systems typically connected thereto. Generally speaking the Internet consists of Autonomous Systems (ASs) type packet data networks which may be owned and operated by Internet Service Providers (ISPs) such as PSI, UUNET, MCI, SPRINT, etc. Three such AS/ISPs appear in FIG. 3 at 310, 312 and 314. The Autonomous Systems (ASs) are linked by Inter-AS Connections 311, 313 and 315. Information providers 316 and 318, such as America Online and Compuserve, connect to the Internet via high speed lines 320 and 322, such as T1/T3 and the like. Information providers generally do not have their own Internet based Autonomous Systems but have or use Dial-Up Networks such as SprintNet (X.25), DATAPAC and TYMNET.

Other information providers, such as universities, are indicated in exemplary fashion at 324 and are connected to the AS/ISPs via the same type connections here illustrated as T1 lines 326. Corporate Local Area Networks (LANs), such as those illustrated in 328 and 330, are connected through routers 332 and 334 and high speed data links such as T1 lines 336 and 338. Laptop computers 290 and 292 are representative of individual computers or other terminals 29 connected to the Internet via the public switched telephone network (PSTN) and are shown connected to the AS/ISPs via dial up links 344 and 346.

The network 27 utilizes packet data protocols to communicate data messages between various nodes coupled to the network. For example, the Internet utilizes protocols commonly referred to as TCP/IP (Transmission Control Protocol/Internet Protocol). TCP/IP is flexible and robust. TCP takes care of the integrity, and IP moves the data through the network.

Each packet transported through the network 27 includes an address. For example, an Internet Protocol address comprises four numbers separated by dots. Higher level addressing utilizes textual domain names which translate into the actual numeric address values. When surfing the 'Web', the terminal utilizes Unique Resource Locator or URL addresses.

For purposes of discussion of the embodiment of FIG. 2, it is assumed that the terminal 29 is a personal computer or PC. Typically, the software running on the PC 29 includes an operating system 291, such as Windows '95, and a series of compatible applications programs running under the operating system. The software implements a graphical user interface. In the preferred implementation, one of the applications running on the PC 29 is a 'browser' 293. The browser provides a graphical user interface for communications through the public packet switched data network 27.

A browser is a software application running on a PC or other terminal 29 which effectively communicates via the public data network 27 to move documents from servers and the like on that network to the user's terminal 29, for display or other processing. Examples of browsers include Internet Explorer and Netscape. A Web browser in the terminal 29 communicates with a server, or in this case with the platform 25, using HyperText Transfer Language Protocol (HTTP).

The pages that the server or platform sends back in HTTP are created in HyperText Mark-Up Language (HTML). HTML is basically a combination of ASCII text, images or graphics, and HTML commands. The browser interprets the HTML commands, for example to display a page in a particular manner. HTML also provides tags which enable hyperlinking to other pages on the network. This link functionality enables a user to activate the terminal to 'point' to and 'click' on a link, and the browser will communicate via the network to obtain the page identified by the URL associated in hypertext with that link. The URL in this case is the actual network address or reference to a remote world wide web site or page.

FIG. 4 is a block diagram of the functional components of a PC implementation of the terminal 29. The main processing element of the PC 29 is a programmable central processing unit (CPU). In the illustrated example, the CPU is a microprocessor 431. The control code for certain basic functions of the microprocessor 431 are stored in a read only memory (ROM) 433. The PC terminal 29 also includes one or more working memories, such as the dynamic random access memory (DRAM) 435, cache memory (not shown) and the like. The microprocessor 431 runs programs loaded into the DRAM 435 from other storage devices.

To store programs, the PC 29 includes a number of different bulk storage systems. In the illustrated example, the PC 29 includes a hard disk drive 437 and one or more floppy disk drives 439; and the PC may include other storage media 441, such as a CD ROM drive, a digital tape drive or the like.

An internal bus system 443 provides two way data communications between the various elements of the PC 29. In particular, the microprocessor 431 receives digital signals from and sends a variety of digital signals to the other computer components via the bus 443.

The PC 29 typically connects through a display driver 445 to a display 447, such as a color cathode ray tube (CRT) type monitor. A user operates a keyboard 449 or another type of input device 451, such as a mouse, trackball or joystick, to input various information to the terminal 29. The input devices 449, 451 connect to the PC 29 through appropriate input ports, represented by the block 453 in the drawing.

The operating system program 291 allows the microprocessor 431 to respond to signals from the input devices 449, 451 and produce signals through the driver 445, to effectuate a desired user interface. For example, a computer running a Windows type operating system provides a graphical user interface, for the operating system functions as well as for applications running on the operating system. The operating system also enables the microprocessor to execute various other application programs, particularly the web browser 293 used for communications via the Internet 27. When running the browser 293 through the operating system 291, the microprocessor 431 receives user inputs from devices 449, 451 and provides visual outputs on the display 447, to provide the graphical user interface for world wide web type communications via the public data network 27.

The PC 29 includes one or more systems enabling communication with other data systems, such as a printer port 455 coupled to the bus 244. The PC 29 also includes one or more data interfaces, to facilitate the communications via the public packet switched data network 27.

There may be data interfaces such as interface 457 to a local area network (LAN). In such an implementation, the LAN would connect to equipment of an Internet Service Provider (ISP) to provide communications for the terminal 29 over the Internet 27, for example through the LAN 328 to the AS/ISP 312 in FIG. 3.

Alternatively, the data interface in the PC 29 may be a modem 459. The modem 459 provides a two-way data communication coupling to a telephone line or other communication network link. The modem sends and receives electrical, electromagnetic or optical signals which carry digital data streams representing various types of information in the format appropriate to the particular link. The dial-up telephone link may go to an information service provider 316 or 318, such as America Online or Compuserve. Alternatively, the PC may use a dial-up telephone link 344 or 346 direct to an AS/ISP network 312 or 314.

Thus, the data interface and associated network link provide data communication through one or more networks to other data devices. For example, the modem 459 may provide a connection through the local telephone network to a host computer or to data equipment operated by an Internet Service Provider (ISP). The ISP equipment in turn provides data communication services through the world wide packet data communication network now commonly referred to as the 'Internet' 27. The local telephone network and the Internet both use electrical, electromagnetic or optical signals which carry digital data streams.

Returning to FIG. 2, the secure access platform includes a firewall 251, a trusted network system (TNS) 253 and a Web Service Management System (WSMS) 255. The firewall 251 connects to the public packet switched data network 27. The firewall 251 communicates with the WSMS 255 through the TNS 253 and the OSN network 21. The firewall 251 and the TNS 255 perform a variety of security related functions. The WSMS 255 provides the actual service management interface functions for telephone customers accessing the system via the public data network 27.

In a system, such as illustrated in the drawings, the communications through the LAN interface 457 or the modem 459 and the connected network link(s) enable communication with any web server on the network 27 using the standard browser and associated protocols. For example, a user of terminal 29 may communicate with a server of information provider 324 to obtain research materials, such as satellite photos. In accord with the invention, these data communication capabilities also enable telephone customers to access a firewall 251 of the platform 25, and through the platform, to access the management systems 24 of the telephone network. This access allows subscribers to obtain information about services and to create or modify their service control data.

FIG. 5 shows an embodiment of the firewall 251 and the TNS 253 in more detail. The firewall 251 comprises an Internet router 510, a computer 520 such as a Sun Spark, and a router 530 for the internal network. The computer 520 runs an operating system 521, and various applications run on that operating system. For purposes of this discussion, the applications include a proxy server application 523 and host software 524. The host software 524 runs a web server 525 and an application server 527. The web server 525 provides static HTML pages in response to requests received from the network 27 via the proxy server 523. The application server 527 provides two-way conversions between the graphical user interface signals communicated through the network 27 and application signals communicated to and from network management systems, particularly the WSMS 255.

The host software 524 also runs an access control routine 528 and maintains a related database 529 of subscriber specific verification and authentication information. An example of the software 528 and associated database 529 is the OM Access software manufactured by Open Logic. The database 529 stores tables of security information relating to each subscriber permitted access through the Internet 27 and the platform 25. The access control software 528 uses these data tables to dynamically generate varying requests for user inputs for authentication. In this manner, the access control 528 authenticates predetermined users who access the platform 25 through the public data network 27 as valid subscribers of services on the telephone network.

The firewall 251 may communicate directly with the TNS 253, but preferably these two systems communicate via routers coupled to one or more networks that make up the OSN network 21. However, for security purposes, the firewall communicates over the internal OSN network only with the TNS 253. As such, the computer 520 and router 530 in the firewall 251 are set up to send and receive messages over the OSN 21 only through the router 540 in the TNS 253. For example, although communications physically flow through the network of OSN 21, the communications between the firewall 251 and the WSMS 255 logically are limited or pipelined to always flow through the TNS 253 as shown by the dotted line arrows in FIG. 2.

The TNS 253 is similar to a firewall in that it includes two routers 540, 560 and a host processor or computer 550, such as a Sun Spark computer, coupled between the routers. The computer 550 runs an operating system 551, and one or more applications run on that operating system. For purposes of this discussion, the applications include a security application 553. Under control of this application, the computer 550 receives and examines messages through the routers 540 and passes the messages through or blocks the messages, in accord with certain established criteria.

The firewall 251 provides interaction with the user and associated interactive security features, such as PIN number and other security code type access procedures. The TNS 253 provides a message and application level of additional security that normally is not noticeable to the user. The user does not interact with the TNS 253, and if messages are valid in accord with the criteria used by the TNS, the messages flow through with no content changes (at least at the application level).

The security application 553 in the TNS passes only certain packets associated with limited acceptable applications. For example, the TNS will pass application packets between the application server 527 of the firewall 251 and the WSMS 255 relating to subscriber inputs for modification of specific subscriber service information. In the opposite direction, the TNS 253 passes packets from the WSMS 255 to the application server 527 that relate to existing subscriber services, service change templates and usage reports. The TNS 253 blocks other messages originating on the Internet and passing through the firewall 251 from going to other nodes on the OSN network 21.

Returning to FIG. 2, the computer system serving as the WSMS 255 runs an operating system 259 and one or more applications. One of the applications on this computer is a Web Service Management System application 257. The computer also runs a database application or connects to a separate database system 258, which stores complete copies of service profiles for at least those telephone subscribers having web link access. The profile data includes data relating to subscribers' switch based service features as well as data relating to AIN type services, i.e. to services provided by the CPRs stored in the SCPs.

The WSMS 255 communicates with various telephone network management systems via the OSN 21. The management and control systems include systems 231 associated with switch based services as well as systems which manage the services provided by the AIN functionality, i.e. as controlled by the SCP 19.

Management and control systems, relating to services controlled by the SCP 19 include service provisioning systems and data reporting systems. The SCP 19 may be implemented in a variety of ways. The SCP may be a general purpose computer running a database application and may be associated with one of the switches 11. Another alternative is to implement a database of CPRs or the like within an STP (see e.g. Farris et al. Pat. No. 5,586,177). In either of these implementations, the various AIN service management systems may be separate from the SCP 19.

In the preferred implementation, however, each SCP 19 actually is an element of Integrated Service Control Point (ISCP) 242 of a type developed by Bell Atlantic and Bell Communications Research. The ISCP 242 is an integrated system in that includes the SCP database as well as a number of closely associated management systems, both for service provisioning and for service reporting.

In this implementation, the SCP 19 is a processor, which maintains a Multi-Services Application Platform (MSAP) database which contains call processing records (CPRs) for processing of calls to and from various subscribers. Among its other system components, the ISCP includes a Service Management System (SMS) and a terminal subsystem referred to as a Service Creation Environment or SCE for provisioning the MSAP database in the SCP for the services subscribed to by each individual customer. The SMS and SCE may be implemented as a single provisioning system, for example a SPACE system 243. The ISCP 242 typically includes a Data and Reporting System (DRS) 244, for accumulating AIN service usage statistics. The elements 19, 243 and 244 within the ISCP 242 communicate with each other via an internal data network, such as a token ring 245.

The ISCP 242 connects through SS7 links (see FIG. 1) to one or more STPs 15, for signaling communications relating to call processing. Each ISCP 242 also communicates with one or more IPs 23 that are under its control. The communications between the ISCP and the IP(s) may use a variety of data communication media, including the OSN 241. The ISCP 242 also may connect to a communicate with one or more other data reporting systems, represented by way of example by the data distributor (DD) 246.

The elements within and associated with one ISCP 242 logically form an ISCP 'site' 241, for managing, providing and reporting intelligent network services for customers served through central offices 11 in a particular area or region. A large carrier typically operates a series of such ISCP sites 241, and FIG. 2 shows ISCP site 1, ISCP site 2 and ISCP site 3, by way of example. For network and service management purposes, the ISCP sites 241 all connect to and communicate via the OSN network 21.

Switch management systems 231 also connect to and communicate with the central office switches 11 and other nodes of the telephone network via the OSN 21. The telephone carriers have developed and operate a wide variety of computerized systems for managing services offered through the telephone central office switches 11, and FIG. 2 shows only a few examples of such systems.

For example, a Memory Administration Recent Change System (MARCH) 233 processes and transmits data to the appropriate central office switches 11 for entry into switch memory, to create and update subscriber profiles in the switches and thereby control services provided by the switches to subscribers.

A Service Order Administration and Control System (SOACS) 237 processes orders for new services or modifications to existing services. For example, when a customer calls and orders a new telephone service associated with the customer's telephone number, for example dial tone, call waiting or caller ID, SOACS 237 performs a number of processes relating to satisfying that order and implementing the requested service. For the switch memory related functions, for example, SOACS processes the data into appropriate format and hands off the formatted data to the MARCH system 233. MARCH in turn qualifies the data, and if the data meets the relevant qualification criteria, MARCH transmits the data to the appropriate central office switch 11 for entry into memory.

Also, the central office switches 11 accumulate Automatic Message Accounting (AMA) records for all calls through the switches. The switches 11 dispatch the AMA records through the OSN network 21 to a computer system serving as a Revenue Accounting Office (RAO) 235.

The OSN 21 illustrated in FIGS. 1 and 2 is a private data network operated by the telephone network operating company, i.e. an intranet. The OSN may comprise a single internal data network or a series of internal data networks. The OSN 21 utilizes any convenient type of local or wide area data network technology, although preferably it is adapted to carry packet data communications in TCP/IP form at some protocol level. For example, the OSN 21 may be a TCP/IP based packet switched network similar to one of the autonomous systems (AS) that comprise the Internet (see FIG. 3).

Consider now the operation of the present invention. A subscriber having a terminal 29 activates the terminal to access the Internet 27 in the normal manner. The user then activates the browser 293 to 'surf' the Internet 27.

The browser software 293 provides a tool for the user to navigate the world wide web and other Internet sites by cursor navigation through use of a mouse, keyboard entry or other equivalent hardware. The user need not know the lengthy Unique Resource Locator (URL) addresses of the sites desired to be accessed. The cursor need only be navigated to a highlighted portion of text or graphics and selection made of the hyperlink to retrieve associated information. The browser interprets the hypertext formatted as hypertext markup language (HTML) and transmitted in HTTP protocol. If the hypertext points to an information source outside the current hypertext page, it initiates a service request to the URL associated with the selected hypertext.

A transaction is initiated by request from an HTTP client for a resource from the server. The client software web browser uses URL to determine the location on the Internet at which the resource may be accessed. In response to a request, the host server will return data that may include a Multipurpose Internet Mail Extension (MIME), a protocol that enables the browser to handle the data returned from the external resource. The MIME extension may indicate an application stored in the user's PC to be activated to use the resource data. When the transaction is completed, the connection between the server and client is broken. The conventional HTTP server does not retain past transactions.

As a typical example of Internet user access, the user may have a PC 29 equipped with a Microsoft Windows operating system that executes a web browser such as Netscape. The user can navigate the screen cursor to a highlighted, hypertext portion of the displayed document and click the appropriate mouse button to make a selection. The browser recognizes the tag as identifying a URL, encapsulates it within an HTTP wrapper, which is then passed to the operating system TCP stack. The operating system initiates a connection with the server's host system. Once communication therebetween has been established, the request is transmitted to the host. The request is passed through the various protocol layers to the HTTP daemon or server. The server interprets the request, checks its MIME type, and sends the client the resource and MIME information. Upon receipt of the resource, the operating system passes the retrieved information to the browser. If the returned data is an HTML document, the browser displays the document on the monitor screen. If the data is a MIME type that the browser cannot handle, the browser checks an associated table to access appropriate stored software for processing. Once the request has been satisfied, the connection between the PC and server is terminated to free up the browser for another request.

Using the browser application 293 in this manner, the user may visit various web sites on the network 27. In accord with the invention, if the user wants to access information regarding telephone services, the user activates the browser 293 to access the web site implemented by the firewall 251.

The proxy server 523 acts as an intermediary and screening agent between the Internet user and the actual systems and networks behind the firewall. The user communicates input information, such as URL page requests, through the Internet 27 and the router 510 to the proxy server 523. The proxy server 523 examines the inputs, and if deemed 'legal' in accord with the security algorithms of the proxy server, the proxy server forwards the input information to the appropriate system or server, either within the host software 524 or through the firewall, the TNS and the OSN to the WSMS 255. The proxy server 523 also receives all outgoing information from the software 524 and from the network elements behind the firewall and formats the information for transmission to the users' terminals.

For example, for initial access to the Internet-Web Link service, the user's terminal 29 sends a request for the telephone company's home page to the proxy server 523. If valid, the proxy server 523 forwards the request and obtains the HTML home page information from the web server 525 and sends the page back through the Internet 27 to the user's terminal 29.

The proxy server 523 also enables other security functions. For example, all outgoing packets transmitted over the public data network 27 from the firewall 251 carry a source address of the firewall 251, to mask the actual network addresses of the equipment behind the firewall. As such, the proxy server 523 blocks direct communication between devices on the public Internet 27 and devices on the telephone company's internal network 21.

As noted above, the host software 524 runs a web server 525 and an application server 527. The web server 525 provides static web pages to users via the proxy server 523 and the Internet 27, in response to web browser based requests from the users. The application server 527 receives HTTP input information and formats the information in an appropriate manner for communication to the Web Service Management System (WSMS) 255. The application server 527 also receives service related information, such as service templates containing subscriber specific information and service usage reports from the WSMS 255, formats that information as HTML web pages and transmits the pages as HTTP protocol messages through the proxy server 523 and the Internet 27 to the user terminal 29 for display.

The host also runs the access control routine 528 and associated database 529 for verification and authentication of subscribers seeking access through the firewall 251. The database 529 stores tables of security information relating to each subscriber permitted access through the Internet-Web Link. The access control software 528 uses these data tables to dynamically generate varying requests for user inputs for authentication. For example, on a first attempt, the access control software 528 might generate a data message for transmission back to the terminal 29 prompting the user for name, social security number and PIN number. If the first attempt fails, the access control software 528 generates another message asking for a different combination of user information, such as PIN number and mother's maiden name. The access control software 528 randomly selects and prompts for the different combination of valid subscriber related authentication information. The random variation of requested information increases the difficulty of hacking into the system.

On the internal network side of the firewall 251, the computer 520 connects through the internal router 530 to one or more private data networks that form the OSN 21, for telephone company communications and network management. The various provisioning systems, such as service creation and management systems for AIN (e.g. SPACE 243) are elements of the OSN 21. Billing and usage reporting systems, such as the data distributors (DDs) 246 and data reporting systems (DRSs) 244 of the ISCP sites 241 also are elements of the OSN 21. At least some of the network's switch management systems 231, such as the MARCH 233, the RAO 235 and the SOACS 237, also connect to one of the networks that form the OSN 21.

In addition to the security provided by the firewall 251, the user seeking access via the Internet 27 must communicate through the 'Trusted Network System' (TNS) 253 logically coupled between the firewall and the OSN elements, particularly the WSMS 255. The TNS 253 passes only certain packets associated with limited acceptable applications. For example, the TNS 253 passes application packets between the application server 527 running in the firewall 251 and the WSMS 255, relating to subscriber inputs for modification of specific subscriber service information. In the opposite direction, the TNS 253 passes packets from the WSMS 255 to the application server 527 that relate to existing subscriber services, service change templates and usage reports.

The internal network node identified as the 'Web Service Management System' (WSMS) 255 provides a subscriber accessible database of the service control information that the subscriber can review and/or change. The SPACE service creation and provisioning systems 243 as well as the data distributors (DDs) 246 and data reporting systems (DRSs) 244 of the various ISCP sites 241 all communicate via the OSN network 21. The switch management systems 231 communicate via the OSN 21. The WSMS 255 is a node or element of the OSN 21. As such, the WSMS 255 can communicate with the SPACE systems 243, the data distributors (DDs) 246 and the data reporting systems (DRSs) 244 and the various switch management systems 231, as needed, to create or modify AIN service control data or to accumulate usage data.

For example, in response to subscriber inputs, the WSMS 255 will update the subscriber profile data in its own database 258 and instruct the SPACE system 243 in the appropriate ISCP site 241 to update call processing records (CPRs) in the SCP 19 serving the subscriber. The WSMS 255 also collects AIN service reporting information from the data reporting systems (DRSs) 244 and/or data distributor (DD) systems 246 from the ISCP sites 241 and upon request provides such data to the user's terminal 29 via the link through the Internet 27.

In practice, a user operates a PC or other terminal device for Internet-web browsing. Through the normal web browsing, a person would access firewall 251 (acting as an Internet server) and select a page, for example a page relating to AIN services, from the home page of the network operating company. The AIN services page would provide information, for example advertising AIN services, and offer several options. Alternatively, the user might select a page relating to switch based services. One option offered on the selected page is subscribers' service management. When a user selects this option, the access security software 528 requests subscriber registration.

A given subscriber may have more than one line, and/or different people may have different types or levels of access to one subscriber's AIN service. The WSMS database 258 stores profile information relating to the subscriber services associated with each telephone number and the levels of Internet access to each such service. When the user successfully completes the registration procedure through the access control 528, the proxy server 523 obtains a page from the application server 527 and the WSMS 255 requesting the telephone number (and possibly another PIN number) related to the service that the subscriber desires to control. The proxy server 523 transmits that page to the subscriber's terminal device 29 through the router 510 and the public packet switched data network 27. The terminal 29 presents the HTML page as a template with one or more boxes for the user to fill in with the necessary information. The subscriber inputs the requested further information on the page, and the terminal device transmits the information as an HTTP message through the Internet 27 for verification.

After identifying and verifying the telephone number, the application server 527 queries the WSMS 255 for the subscriber profile information relating to the specified telephone number. In an application to change service information, the query would request information regarding the service(s) associated with the telephone number and the current control information, such as blocked calling party telephone numbers. For an AIN service, for example, the WSMS 255 retrieves the necessary information from its database 258 and/or the provisioning system 243 serving the ISCP site 241, which controls AIN services for the particular telephone number. The WSMS 255 transmits that information back to the application server 527 through the OSN 21 and the TNS 253. The application server 527 formats the service information as one or more HTML web pages and forwards the pages to the proxy server 523 for transmission through the Internet 27 to the user's terminal device 29. Essentially, these web page(s) comprise a template for the type of service to which this user subscribes filled in with the current information and prompting the user for selection of change options.

While viewing the page(s) showing the current service information on their terminal 29, the subscriber can point-and-click on hypertext links displayed on the page to modify displayed service features. The subscriber also can type in specific detailed information in fields of the service control template(s). When the subscriber completes any such input, the browser 293 in the terminal 29 transmits the input information back through the Internet 27 to the proxy server 523. If the input information is 'legal,' the proxy server 523 forwards the information in appropriate form to the application server 527.

The application server 527 in turn parses and reformats the subscriber input formation for transmission through the OSN 21 and the TNS 253 to the WSMS 255. If the subscriber input information passes all validity checks, the WSMS 255 updates the subscriber profile information in its database 258, for the affected AIN service(s) associated with the telephone number. The WSMS 255 then forwards appropriate instructions for entry of the new service control information through the OSN 21 to the service provisioning system 243. The provisioning system 243 inputs the data for storage in the SCP(s) 19 controlling the particular service. If necessary, the system 243 also modifies any effected subscriber data stored in the IPs 23 associated with the ISCP site 241. If establishing a new AIN service, the WSMS 255 also works through the appropriate switch management system (s) 231 to set any triggers necessary to implement the new service in the appropriate CO(s) 11.

Consider an AIN type service example. Assume that the telephone subscriber using station $1_A$ has an existing AIN based call blocking service. One option of such a service might be a VIP list. Whenever the service is active, calls from stations associated with telephone numbers on the list pass directly through to the subscriber's station $1_A$. However, during such times, calls from stations associated with other numbers do not go through. The network may route such calls to a message announcing that call blocking is active, or the network may route such calls to the subscriber's voice mail.

To facilitate the exemplary call blocking service, assume that the subscriber associated with station $1_A$ has a customer profile record (CPR) stored in the database in the SCP 19. The CPR for this subscriber includes a pointer based on the type of trigger used and the called telephone number, in this case the number assigned to the line from the serving end office switch $11_E$ to the customer premises $31_A$. The CPR includes or points to a table listing the telephone numbers that the subscribers wants on her VIP list for the call blocking service. A typical VIP list for such a service might have the capability to list up to fifteen telephone numbers.

In accord with the invention, the subscriber uses her terminal $29_A$ to access the platform 25 via the Internet 27. After the security verification and identification of the telephone number and the service of interest (call blocking in this example), the application server 527 queries the WSMS 255 for the subscriber profile information relating to the specified telephone number and service. The WSMS 255 retrieves the necessary information from its database 258 and/or the SPACE system 243 serving the ISCP site 241, which controls AIN services for the particular telephone number. The WSMS 255 transmits that information back to the application server 527 through the OSN 21 and the TNS 253. The application server 527 formats the service information as an HTML web page and forwards the page to the proxy server 523 for transmission through the Internet 27 to the user's terminal device $29_A$.

In this example, the terminal $29_A$ displays a web page relating to the caller's blocking service and including the telephone numbers currently contained in the subscriber's VIP list. The list preferably includes textual information associated with the numbers, such as the names of people expected to call from the respective numbers.

While viewing the page on her terminal $29_A$, the subscriber can point-and-click on a hypertext link displayed on the page to enable modification of the displayed VIP list. This may result in display of another page, or the subscriber may be able to modify the VIP list from the current page. In either case, the subscriber can activate the keyboard 449 of the terminal $29_A$ to modify items on the list, for example to change numbers or associated names. The subscriber also can activate the keyboard 449 of the terminal $29_A$ to add new numbers and associated names or to delete entire items (names and numbers) from the list. When the subscriber completes the desired modification of the VIP list, the subscriber activates her terminal $29_A$, and the browser 293 transmits the input information back through the Internet 27 to the proxy server 523. If the input information is 'legal,' the proxy server 523 forwards the information in appropriate form to the application server 527.

The application server 527 in turn parses and reformats the subscriber input formation for transmission through the OSN 21 and the TNS 253 to the WSMS 255. If the subscriber input information passes all validity checks, the WSMS 255 updates the subscriber profile information in its database 258, to replace the old version of the VIP list with the new version. The WSMS 255 then forwards appropriate instructions for entry of the changes to this subscriber's VIP list through the OSN 21 to the provisioning system 243. The system 243 inputs the data for storage in the associated SCP 19.

Through a similar procedure, the subscriber can access various reports regarding usage of AIN services. In response to an HTTP message requesting such a report, the application server 527 queries the WSMS 255 through the OSN 21 and the TNS 253. From its database 258 and/or by querying the reporting systems (DD and DRS) 244, 246 of the ISCP site 241 serving the subscriber, the WSMS 255 compiles the requested report data. The WSMS 255 transmits the report data through the OSN 21 and the TNS 253 to the application server 527. The application server in turn formats the report as one or more HTML web pages and forwards the pages to the proxy server 523. The proxy server communicates via the router 510 and the Internet 27, to supply the web pages of the report to the user's terminal device 29 for storage and/or display. The Internet-Web Link system also offers subscribers options to receive usage reports via E-mail or as File Transfer Protocol (FTP) type file transfers.

In the call blocking example, the subscriber at premiss $31_A$ might use the web link access technique to obtain a report of how many calls to her number were blocked during the latest active call blocking period and possibly the telephone numbers of the calling parties.

These first operational examples described above related to AIN services facilitated through the ISCP sites 241. The secure access platform 25 facilitates similar access to the switch management systems 231.

The subscriber database 258 associated with the WSMS 255 provides a subscriber accessible database of the control information for switch based service features, as well as AIN service. As with the AIN services, the subscriber can review and/or change the profile information for switch based features in the WSMS, via the Internet link. For this purpose, the WSMS 255 communicates with various switch management systems 231 through the OSN network 21, for example with SOACS 237 and the RAO 235.

For example, in response to subscriber inputs, the WSMS 255 will update the subscriber profile data in its own database 258 and instruct the SOACS system 237 to update the profile records in the end office switch $11_E$ serving the subscriber. SOACS 327 processes the data into appropriate format and hands off the formatted data to the MARCH system 233. MARCH in turn qualifies the data, and if the data meets the relevant qualification criteria, MARCH transmits the data through the OSN 21 to the appropriate central office switch 11 for entry into memory.

In response to other inputs from the subscriber, the WSMS 255 also collects service reporting information relating to switch based features. The WSMS may collect AMA records or station message detail recording (SMDR) reports. In the illustrated example, the WSMS 255 communicates through the OSN 21 with the Revenue Accounting Office (RAO) 235, to obtain information relating to a customer's billing account.

The WSMS 255 transmits the report data regarding switch services or the billing data from the RAO 235 through the OSN 21 and the TNS 253 to the application server 527. The application server in turn formats the report as one or more HTML web pages and forwards the pages to the proxy server 523. The proxy server communicates via the router 510 and the Internet 27, to supply the web pages of the report or account statement to the user's terminal device 29 for storage and/or display.

The 'subscribers' to services of the telephone network include individuals and businesses and the like. The 'subscribers' also include carriers who obtain services from the telephone network operating company.

The above operational examples of service modification and review of usage statistics and account statements are applicable to business or residential subscribers who might access their AIN services via the Internet. The present invention also enables carriers obtaining certain AIN and/or switch based services from the company operating the telephone network of FIG. 1 to access the telephone network management systems. In this manner, other carriers might choose to control their services and obtain reports via the Internet. For example, a competing local exchange carrier (CLEC) might obtain AIN services from the local exchange carrier (LEC) at a discount and resell those services to local customers of the CLEC. Using the inventive access, the CLEC could administer and control provisioning of the AIN services for the customers of the CLEC. The CLEC also could monitor usage and obtain statements of its account with the LEC as well as usage data reports, for formulating bills to the CLEC's customers. A cellular carrier or an IXC also might use this access to review control data and to modify service control data relating to intelligent telephone services provided by the LEC for their own customers on some type of resale basis.

The present invention may operate in accord with a wide range of further enhancements. For example, the platform 25 could actually advertise services to new subscribers, obtain trial or purchase order subscriptions, take subscriber information and provision new services, all via the web page based Internet access. In such cases, the system executes a registration procedure to obtain the validation information for a new subscriber, and then the system conducts an interactive session with the user to select desired services. For AIN services, the WSMS 255 then instructs the provisioning system 243 in the appropriate ISCP site 241 to create a new call processing record (CPR) and store that CPR in the appropriate SCP 19. For switch based features and/or for setting AIN service triggers, the WSMS 255 interacts with automated switch provisioning systems in 231 to load the appropriate subscriber profile data into the central office switch(es) 11 that will provide the desired services to the particular customer.

In this manner, a person can receive information and advertisements about new services and subscribe to the services, via his existing terminal using a standard graphical user interface. The system automatically controls the management systems and control elements of the telephone network to implement the new customer's service selection.

As noted earlier, the subscriber can use the Internet-web link access to review billing account related information from the revenue accounting office RAO. Another enhancement to the system is to enable electronic bill payment via the Internet access link. For example, after review of the bill, a subscriber might provide a credit card number, authorize payment through a credit card account number previously provided or authorize electronic funds transfer from a checking account, etc.

The web interface provided by the platform 25 will offer some on-line help options. These options may be simple textual messages presented upon request, or the system may offer live help. For example, the web interface may offer the user the option to exchange electronic messages with a live operator, in a manner similar to a private chat-room session. Alternatively, the system might offer an option for a live telephone or video conference session with an operator (see e.g. commonly assigned applications Ser. Nos. 08/563,243 and 08/815,359). The network would present the live operator with a display of operations performed by the user as well as the live communication. This would enable the operator to quickly identify any difficulties that the user has encountered and offer verbal advice or electronic message advice, or to perform operations requested by the user.

The security provided through the firewall discussed above is exemplary only. The firewall may provide a lower level of security or more likely higher levels of security. For example, the firewall could also use secure socket link protocol version 3 and/or a 'pretty good privacy point code' to provide an encrypted digital 'signature' of each user attempting access through the firewall, and thus provide further assurance that users are authentic subscribers.

On a further point, the above embodiments involved communication between the WSMS and various management systems of the telephone network. The management systems then communicated with the actual nodes of the telephone network. Another enhancement would be to allow the WSMS to communicate directly with the control nodes of the a telephone network, the SCPs and the COs for example, to directly input the CPRs, the profile information and any other control data.

Also, the above discussion has concentrated on management of subscribers telephone services. The present invention may provide web link access to manage communication services provided through other types of networks. For example, if the carrier operated a broadband network, such as a digital video dial tone network or a full service network, the secure access platform of the present invention could connect to the network management elements thereof, to offer the Internet access and enable customers to manage their broadband services as well as any narrowband services provided by the particular communication network.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A communication network comprising:

a plurality of central office switching systems interconnected by trunk circuits for providing selectively switched communication services over communication links coupled to the central office switching systems;

a service control point, separate from at least one of the central office switching systems, storing subscribers call processing records for controlling at least some of the selectively switched communication services provided through the central office switching systems for the subscribers;

an interoffice signaling network, separate from the trunk circuits, coupled to the central office switching systems and coupled to the service control point;

a provisioning system coupled for communication with the service control point for establishing and modifying subscriber call processing records stored in the service control point;

a private data communication network coupled to the provisioning system;

a service management system coupled to the private data communication network, said service management system maintaining a database of subscriber profile information for subscribers of the communication network, said service profile information relating to services enabled by the subscribers call processing records stored in the service control point, said service management system for updating a subscriber's profile in the database and sending control data to the provisioning system in response to subscriber inputs to cause the provisioning system to modify call processing records stored in the service control point and for receiving service data from the provisioning system for transmission to subscribers; and a firewall coupled to the private data network for coupling to a public data network, said firewall providing a standardized graphical user interface to users accessing the firewall via the public data network, validating predetermined users of the public data network as subscribers, processing standardized interface signals from validated users terminals to provide the subscriber inputs to the service management system, and processing the service data from the service management system for transmission to the validated users terminals in accord with the standardized graphical user interface.

2. A communication network as in claim 1, wherein the firewall comprises:

a proxy server for communications via the public data network; and host software coupled to the proxy server for interfacing the proxy server to the private data network for communications through the private data network with the service management system.

3. A communication network as in claim 2, wherein the host software comprises:

a web server for providing static web page information regarding services offered by the communication network;

an application server providing two-way conversion between formats of the graphical user interface and a message protocol utilized by the service management system; and an access control routine for validating predetermined users as subscribers.

4. A communication network comprising:

a plurality of central office switching systems interconnected by trunk circuits for providing selectively switched communication services over communication links coupled to the systems;

a provisioning system coupled for communication with the central office switching systems for establishing and modifying subscriber profile data stored in the central office switching systems, said subscriber profile data controlling at least some of the selectively switched communication services provided through the central office switching systems;

a private data communication network coupled to the provisioning system;

a service management system coupled to the private data communication network, said service management system maintaining a database relating to services enabled by the stored subscriber profile information for the subscribers of the communication network, said service management system for updating a subscriber's profile information in the database and sending control data to the provisioning system to update a corresponding subscriber profile stored in a central office switching system in response to subscriber inputs and for receiving service data from the provisioning system for transmission to subscribers; and a firewall coupled to the private data network for coupling to a public data network, said firewall providing a standardized graphical user interface to users accessing the firewall via the public data network, validating predetermined users of the public data network as subscribers, processing standardized interface signals from validated users terminals to provide the subscriber inputs to the service management system, and processing the service data from the service management system for transmission to the validated users terminals in accord with the standardized graphical interface.

5. A communication network as in claim 4, wherein the firewall comprises:

a proxy server for communications via the public data network; and host software coupled to the proxy server for interfacing the proxy server to the private data network for communications through the private data network with the service management system.

6. A communication network as in claim 5, wherein the host software comprises:

a web server for providing static web page information regarding services offered by the communication network;

an application server providing two-way conversion between formats of the graphical user interface and a message protocol utilized by the service management system; and an access control routine for validating the predetermined users of the public data network as subscribers.

7. A communication network comprising:

a traffic network having a plurality of nodes for providing selective communications to subscriber stations;

an operations network;

a network management system coupled to the operations network for managing selective communication services provided through the nodes of the traffic network; and a secure access platform coupled to the operations network and for coupling to a public data network, said secure access platform comprising:

(1) a firewall server for validating predetermined users of the public data network as subscribers to services of the communication network and implementing a standard graphical user interface of the public data network for communications to and from terminals on the public data network; and (2) a service management system in communication with the firewall server and the network management system, said service management system maintaining a database of profile data for the subscribers to services of the communication network and respective services of the subscribers, for enabling subscribers to review service data from the network management system and to input control data to the network management system, wherein in response to the control data, the service management system modifies subscriber profile data in the database and instructs the network management system to modify operations of the traffic network as selected by the validated subscribers.

8. A communication network as in claim 7, wherein the nodes of the traffic network comprise central office telephone switching systems interconnected by trunk circuits.

9. A communication network as in claim 8, wherein the network management system provides subscriber profile data to the central office telephone switching systems to control call processing operations thereof in response to the input control data.

10. A communication network as in claim 8, wherein the service data relates to usage of call processing services through one or more of the central office telephone switching systems.

11. A communication network as in claim 8, wherein the communication network further comprises an interoffice signaling network, separate from the trunk circuits, for transporting signaling messages between the central office telephone switching systems.

12. A communication network as in claim 11, further comprising a service control point coupled for communication with the central office telephone switching systems via the interoffice signaling network, said service control point storing data to provide instructions to the central office telephone switching systems to control processing of at least some calls.

13. A communication network as in claim 12, wherein the network management system provides subscriber data for storage in the service control point in response to the input control data.

14. A communication network as in claim 12, wherein the service data relates to current services provided by data stored data in the service control point.

15. A communication network as in claim 12, wherein the service data relates to usage of the services provided to subscribers by the service control point.

16. A communication network as in claim 7, wherein the network management system comprises a provisioning system.

17. A communication network as in claim 7, wherein the network management system comprises a usage data processing system.

18. A communication network as in claim 17, wherein the usage data processing system comprises a revenue accounting office for generating bills in response to service usage statistics.

19. A communication network as in claim 7, wherein the standard graphical user interface implemented by the firewall comprises an Internet browser interface.

20. A communication network as in claim 7, wherein the secure access platform further comprises a trusted network system coupled to the operations network, wherein all communications between the firewall and the service management system pass through and are validated by the trusted network system.

21. A communication network as in claim 7, wherein the firewall comprises:

a proxy server;

an application server providing the standard graphical user interface through the proxy server for users accessing the firewall via the public data network; and an access control authenticating predetermined users of the public data network as valid subscribers of the communication network.

22. A communication network as in claim 21, wherein the firewall further comprises:

a router for coupling to the public data network;

a router for coupling to the operations network and providing communications from the firewall through the operations network with the service management system; and a computer running software to implement the proxy server, the application server and the access control.

23. A communication network as in claim 21, wherein:

the application server transmits information received from the service management system in a standard page format compatible with the public data network; and the application server receives hypertext inputs from user terminals via the proxy server and processes the hypertext inputs to communicate said subscriber inputs to the service management system.

24. A communication network as in claim 23, wherein the application server provides a web page interface for a standard web browser implemented on user terminals coupled to the public packet data network.

25. A communication network as in claim 7, wherein the traffic network comprises a public exchange carrier's network.

26. A communication network as in claim 25, wherein the public exchange carrier's network comprises a local exchange carrier network.

27. A communication network as in claim 25, wherein the public exchange carrier's network comprises an interexchange carrier network.

* * * * *